US012801719B2

(12) United States Patent
Shinohara et al.

(10) Patent No.: US 12,801,719 B2
(45) Date of Patent: Nov. 17, 2026

(54) AUTHENTICATION SYSTEM, GENERATION DEVICE, GENERATION METHOD, AND GENERATION PROGRAM

(71) Applicant: NTT, Inc., Tokyo (JP)

(72) Inventors: Masanori Shinohara, Musashino (JP); Hiroyoshi Takiguchi, Musashino (JP); Yuki Yamanaka, Musashino (JP); Yoshiaki Nakajima, Musashino (JP); Tomohiro Nagai, Musashino (JP)

(73) Assignee: NTT, Inc., Tokyo (JP)

(*) Notice: Subject to any disclaimer, the term of this patent is extended or adjusted under 35 U.S.C. 154(b) by 63 days.

(21) Appl. No.: 18/840,307

(22) PCT Filed: Feb. 22, 2022

(86) PCT No.: PCT/JP2022/007420

§ 371 (c)(1),
(2) Date: Aug. 21, 2024

(87) PCT Pub. No.: WO2023/162048

PCT Pub. Date: Aug. 31, 2023

(65) Prior Publication Data

US 2025/0165581 A1 May 22, 2025

(51) Int. Cl.
*G06F 21/44* (2013.01)
*H04L 9/32* (2006.01)

(52) U.S. Cl.
CPC ............ *G06F 21/44* (2013.01); *H04L 9/3271* (2013.01)

(58) Field of Classification Search
CPC ............................... G06F 21/44; H04L 9/3271
USPC ............................................................ 726/17
See application file for complete search history.

(56) References Cited

U.S. PATENT DOCUMENTS

| | | | |
|---|---|---|---|
| 2007/0156638 A1 | 7/2007 | Vadekar et al. | |
| 2008/0289038 A1 | 11/2008 | Kim et al. | |
| 2014/0281525 A1* | 9/2014 | Acar | H04L 9/3226 713/168 |
| 2018/0097614 A1* | 4/2018 | Sherman | H04L 9/007 |
| 2019/0103972 A1* | 4/2019 | Pope | H04L 9/0894 |
| 2021/0365592 A1* | 11/2021 | Rabbani | G06F 1/04 |

FOREIGN PATENT DOCUMENTS

| | | | |
|---|---|---|---|
| AU | 8425901 | A | 3/2002 |
| JP | 2004-509392 | A | 3/2004 |
| JP | 2008-541211 | A | 11/2008 |
| WO | 00/18162 | | 3/2000 |
| WO | 2002021243 | A2 | 3/2002 |

OTHER PUBLICATIONS

Sun, "OAT: Attesting Operation Integrity of Embedded Devices", 2020, IEEE, pp. 1-13 (Year: 2020).*

(Continued)

*Primary Examiner* — Taghi T Arani
*Assistant Examiner* — Gregory A Lane
(74) *Attorney, Agent, or Firm* — XSENSUS LLP

(57) ABSTRACT

A generation device includes generation circuitry configured to generate model common firmware used for challenge-response authentication by writing a predetermined random number and index information indicating an area to be subjected to hash calculation in a free space of the firmware.

15 Claims, 13 Drawing Sheets

(56) References Cited

OTHER PUBLICATIONS

Neshenko, “Demistifying IoT Security: An Exhaustive Survey on IoT Vulnerabilities and a First Empirical Look on Internet-scale Exploitations”, 2019, IEEE, pp. 1-27 (Year: 2019).*
Li, Y. et al. “VIPER: verifying the integrity of PERipherals’ firmware” InProceedings of the 18th ACM conference on Computer and communications security Oct. 17, 2011 pp. 3-16 (14 pages).
Agrawal et al., “Detection of Node Capture Attack in Wireless Sensor Networks”, IEEE Systems Journal, vol. 13, No. 1, Mar. 2019, pp. 238-247.

* cited by examiner

AUTHENTICATION SYSTEM, GENERATION DEVICE, GENERATION METHOD, AND GENERATION PROGRAM

CROSS-REFERENCE TO RELATED APPLICATION

The present application is a national stage application, pursuant to 35 U.S.C. § 371, of International Patent Application No. PCT/JP2022/007420, filed Feb. 22, 2022, the entire contents of which are incorporated herein by reference.

TECHNICAL FIELD

The present invention relates to an authentication system, a generation device, a generation method, and a generation program.

BACKGROUND ART

Malware (e.g. Mirai) invades not only information and communication technology (ICT) devices such as personal computers (PCs) but also Internet of Things (IoT) devices and the like that do not have hardware such as a secure element and causes the devices to participate in a botnet, which causes widespread damage to the devices.

CITATION LIST

Non Patent Literature

Non Patent Literature 1: Sarita Agrawal, Manik Lal Das, Javier Lopez, "Detection of Node Capture Attack in Wireless Sensor Networks", IEEE SYSTEMS JOURNAL, VOL. 13, March 2019 <https://ieeexplore.ieee-.org/document/8444374>

SUMMARY OF INVENTION

Technical Problem

However, the related art cannot effectively verify integrity of IoT devices. This is because, although a physical root of trust such as a security chip is generally used to ensure security of ICT devices, the physical root of trust is frequently not mounted in a dedicated device such as an IoT device or a communication device.

In a case where the physical root of trust is not mounted, the related art needs to generate individual firmware incorporating different random numbers for each device. Therefore, the same firmware cannot be used in the same model. Further, in the above related art, an IoT gateway also needs to manage different types of firmware data for each integrity verification target device, and, when the number of devices increases, an amount of data managed by the IoT gateway increases. Furthermore, in the above related art, a hash value of an entire memory image is taken, and thus a device having a variable portion in a memory is excluded.

The present invention has been made in view of the above, and an object thereof is to provide an authentication system, a generation device, a generation method, and a generation program capable of effectively verifying integrity of IoT devices.

Solution to Problem

In order to solve the above problem and achieve the object, an authentication system according to the present invention is an authentication system including a generation device that generates firmware, a verifier device that verifies integrity, and a prover device that proves the integrity, in which: the generation device includes generation circuitry configured to generate model common firmware used for challenge-response authentication by writing a predetermined random number and index information indicating an area to be subjected to hash calculation in a free space of the firmware; the verifier device includes verifier circuitry configured to generate a challenge for the prover device on the basis of the model common firmware held by the verifier device; and the prover device includes prover circuitry configured to generate a response to the verifier device on the basis of the model common firmware held by the prover device.

In order to solve the above problem and achieve the object, a generation device according to the present invention includes generation circuitry configured to generate model common firmware used for challenge-response authentication by writing a predetermined random number and index information indicating an area to be subjected to hash calculation in a free space of the firmware.

A generation method according to the present invention is a generation method performed by a generation device, the generation method including generating model common firmware used for challenge-response authentication by writing a predetermined random number and index information indicating an area to be subjected to hash calculation in a free space of the firmware.

A non-transitory computer-readable recording medium storing therein a generation program according to the present invention causes a computer to execute generating model common firmware used for challenge-response authentication by writing a predetermined random number and index information indicating an area to be subjected to hash calculation in a free space of the firmware.

Advantageous Effects of Invention

The present invention can effectively verify integrity of IoT devices by using model common firmware.

DESCRIPTION OF EMBODIMENTS

Hereinafter, embodiments of a firmware generation device (generation device), a firmware generation method (generation method), and a firmware generation program (generation program) according to the present invention will be described in detail with reference to the drawings. Note that the present invention is not limited to the embodiments described below.

First Embodiment

Hereinafter, a configuration of an authentication system 100 according to a first embodiment, a configuration of each device of the authentication system 100, a specific example of each kind of processing, and a flow of authentication processing will be described in this order, and, finally, effects of the first embodiment will be described.

[1. Configuration of Authentication System 100]

Figure 1:
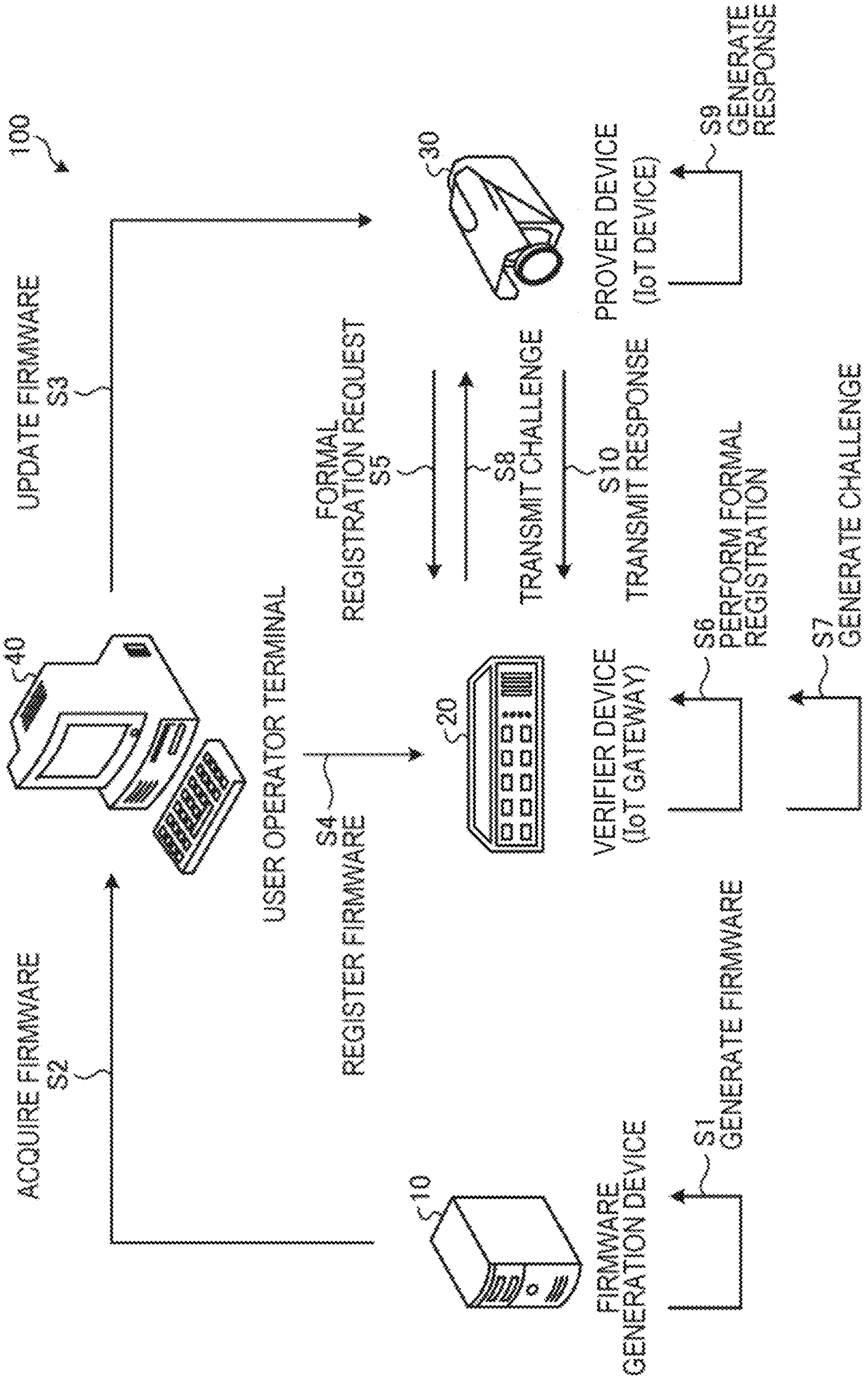
FIG. 1 illustrates a configuration example of an authentication system according to a first embodiment.

The configuration of the authentication system 100 according to the first embodiment will be described in detail with reference to FIG. 1. FIG. 1 illustrates a configuration example of the authentication system according to the first embodiment. Hereinafter, each kind of processing will be described by showing the configuration example of the entire authentication system 100.

(1-1. Configuration Example of Entire Authentication System 100)

As illustrated in FIG. 1, the authentication system 100 includes a firmware generation device 10, a verifier device 20 such as an IoT gateway, a prover device 30 such as an IoT device (simply referred to as "device" as appropriate), and a user operator terminal 40. The firmware generation device 10, the verifier device 20, the prover device 30, and the user operator terminal 40 are communicably connected in a wired or wireless manner via a predetermined communication network (not illustrated). The authentication system 100 in FIG. 1 may include a plurality of firmware generation devices 10, a plurality of verifier devices 20, a plurality of prover devices 30, or a plurality of user operator terminals 40.

(1-1-1. Firmware Generation Device 10)

The firmware generation device 10 is a device (computer) that generates firmware that is a program to be installed in the prover device 30 such as the IoT device. The firmware generation device 10 receives an operation from an administrator of the firmware generation device 10, such as a device manufacturer M. The firmware generation device 10 is implemented by, for example, a dedicated device for manufacturing IoT devices, a server device, or a desktop PC. In the example of FIG. 1, the firmware generation device 10 is implemented by a server device.

(1-1-2. Verifier Device 20)

The verifier device 20 is a device (computer) that verifies the integrity of the IoT device. The verifier device 20 has an integrity verification program (verifier) that verifies whether or not memory information of the IoT device or the like is falsified. In the example of FIG. 1, the verifier device 20 is implemented by an IoT gateway.

(1-1-3. Prover Device 30)

The prover device 30 is a device (computer) that proves the integrity and is a small information device manufactured by the device manufacturer M or the like on the premise of connection to the Internet. The prover device 30 has specific information (e.g. media access control (MAC) address and device serial number) for uniquely identifying the IoT device or the like. The prover device 30 has an integrity verification program (prover) that proves whether or not the memory information of the IoT device or the like is falsified. In the example of FIG. 1, the prover device 30 is implemented by the IoT device such as a camera.

(1-1-4. User Operator Terminal 40)

The user operator terminal 40 is a device (computer) that updates firmware of the prover device 30 or registers firmware in the verifier device 20. The user operator terminal 40 is a terminal used by a user operator (simply referred to as "user" as appropriate) U. The user operator terminal 40 is implemented by, for example, a smartphone, a tablet terminal, a laptop personal computer (PC), a desktop PC, a mobile phone, or a personal digital assistant (PDA). In the example of FIG. 1, the user operator terminal 40 is implemented by a desktop PC.

(1-2. Processing of Authentication System 100)

Hereinafter, firmware generation processing (step S1), firmware update/registration processing (steps S2 to S4), formal registration processing (steps S5 to S6), challenge transmission processing (steps S7 to S8), and response transmission processing (steps S9 to S10) will be described as processing of the authentication system 100. The following steps S1 to S10 can be performed in different orders. Among the following steps S1 to S10, part of the processing may be omitted.

(1-2-1. Firmware Generation Processing)

First, the firmware generation device 10 generates firmware (model common firmware) used for challenge-response authentication by writing a random number (hereinafter, "predetermined random number") generated by a predetermined procedure and index information in a free space of the firmware (step S1). Details of the firmware generation processing will be described later in [3. Specific Example of Each Kind of Processing in Authentication System 100] (3-2. Hash Calculation Processing).

(1-2-2. Firmware Update/Registration Processing)

Next, the user operator terminal 40 acquires the firmware of the prover device 30 generated by the firmware generation device 10 (step S2). Then, the user operator terminal 40 updates (firmware update) the prover device 30 such as the IoT device (step S3). Further, the user operator terminal 40 uses the firmware generated by the firmware generation device 10 to register the firmware in the verifier device 20 such as the IoT gateway (step S4). Details of the firmware update/registration processing will be described later in [3. Specific Example of Each Kind of Processing in Authentication System 100] (3-4. Authentication Processing) (3-4-2. Specific Example of Device Registration).

(1-2-3. Formal Registration Processing)

Then, the prover device 30 issues a formal registration request of the device or the like to the verifier device 20 such as the IoT gateway (step S5). Further, the verifier device 20 formally registers the device or the like (step S6). Details of the formal registration processing will be described later in [3. Specific Example of Each Kind of Processing in Authentication System 100] (3-4. Authentication Processing)

(3-4-2. Specific Example of Device Registration).

(1-2-4. Challenge Transmission Processing)

Then, the verifier device 20 generates a challenge on the basis of the model common firmware held by the verifier device 20 (step S7). Further, in order to verify the integrity of the IoT device or the like, the verifier device 20 transmits the generated challenge to the prover device 30 (step S8). Details of the formal registration processing will be described later in [3. Specific Example of Each Kind of Processing in Authentication System 100] (3-4. Authentication Processing) (3-4-3. Specific Example of Integrity Verification).

(1-2-5. Response Transmission Processing)

Then, the prover device 30 generates a response on the basis of the model common firmware included in the prover device 30 (step S9). Further, in order to prove the integrity of the IoT device or the like, the prover device 30 transmits the generated response to the verifier device 20 (step S10). Details of the formal registration processing will be described later in [3. Specific Example of Each Kind of Processing in Authentication System 100] (3-4. Authentication Processing) (3-4-3. Specific Example of Integrity Verification).

(1-3. Effect of Authentication System 100)

Hereinafter, effects of the authentication system 100 will be described in detail by describing problems of Trusted platform module enabled Program Integrity Verification (TPIV) as a reference technique.

(1-3-1. Problems)

First, TPIV will be described as a reference technique. A technique using TPIV prevents malware from being hidden in a free space of firmware by filling the free space with random number data that is difficult to compress. The above technique is used to share information between the IoT gateway (verifier device) and the IoT device (prover device) by using a hash value of the entire firmware in which random numbers are embedded as a common key. At this time, the following two advantages are expected by using the firmware. A first advantage is that the above technique can prevent spoofing at the time of initial registration by using the firmware. That is, the firmware can be used as a unique ID for the IoT gateway to verify whether or not a target device is authentic. A second advantage is that the above technique can prevent falsification by using the firmware. That is, the firmware can be used as target data of hash calculation for verifying the integrity.

However, the technique using TPIV has the following three problems. A first problem is that the above technique needs to generate individual firmware incorporating different random numbers for each device, and thus the same firmware cannot be used in the same model. A second problem is that, in the above technique, the IoT gateway also needs to manage different types of firmware data for each integrity verification target device, and, when the number of devices increases, an amount of data managed by the IoT gateway increases. A third problem is that, in the above technique, a hash value of an entire memory image is taken, and thus a device having a variable portion in a memory is excluded.

(1-3-2. Overview)

In the authentication system 100, the firmware generation device 10 generates model common firmware used for challenge-response authentication by writing a predetermined random number and index information indicating an area to be subjected to hash calculation in a free space of the firmware, the verifier device 20 that verifies the integrity generates a challenge for the prover device 30 on the basis of the model common firmware held by the verifier device 20, and the prover device 30 that proves the integrity generates a response to the verifier device 20 on the basis of the model common firmware installed in the prover device 30.

Further, in the authentication system 100, the firmware generation device 10 generates the model common firmware by generating the predetermined random number common to each model of the prover device 30 and the index information including a head address and size of a memory area to be subjected to hash calculation and writing the predetermined random number and the index information in the free space of the firmware. The verifier device 20 reads target data of hash calculation by using the index information included in the model common firmware held by the verifier device 20, executes hash calculation by using information specific to the prover device 30 and the target data, and generates the challenge. The prover device 30 reads target data of hash calculation by using the index information included in the model common firmware held by the prover device 30, executes hash calculation by using information specific to the prover device 30 and the target data, and generates the response.

(1-3-3. Effects)

Therefore, the authentication system 100 contributes to solving the above problems of the technique using TPIV. For the first problem, because the authentication system 100 uses a common random number for the same model, the device manufacturer does not need to create different types of firmware for each device. For the second problem, because the authentication system 100 uses the common random number for the same model, an amount of data managed by the IoT gateway is reduced by sharing the same firmware data. For the third problem, the authentication system 100 causes firmware of a device to include index information indicating a memory range used for hash creation and excludes variable data from a hash target, thereby allowing a device having a variable portion in its memory to be a target of integrity verification.

From the above, the authentication system 100 can verify the integrity as software even for a device that does not have the physical root of trust such as a secure element and add a security function at low cost, that is, can achieve "expansion of target devices". In addition, in an actual device manufacturing site, it is difficult to incorporate different kinds of software for each individual device to distribute and manage the devices in terms of cost and operation. The authentication system 100 can use the same software for the same model at a manufacturing stage, that is, can achieve "lowering an introduction barrier". That is, the authentication system 100 verifies the integrity of IoT devices by using model common firmware and thus can effectively verify the integrity of the IoT devices.

[2. Configuration of Each Device in Authentication System 100]

Figure 2:
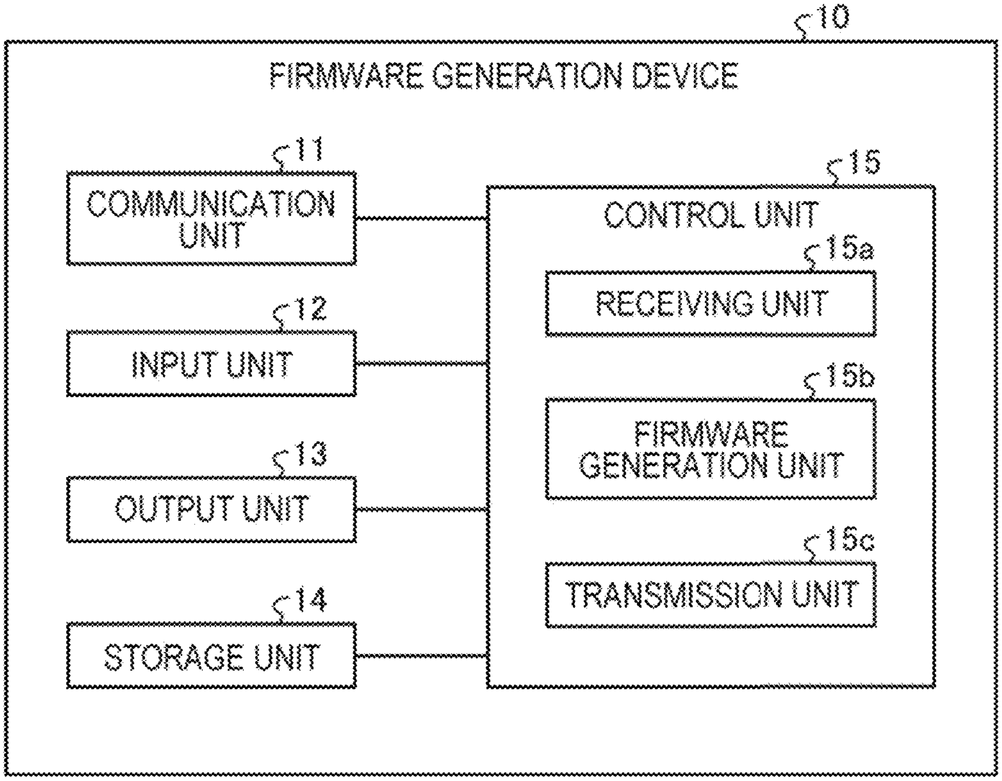
FIG. 2 is a block diagram illustrating a configuration example of a firmware generation device according to the first embodiment.
Figure 3:
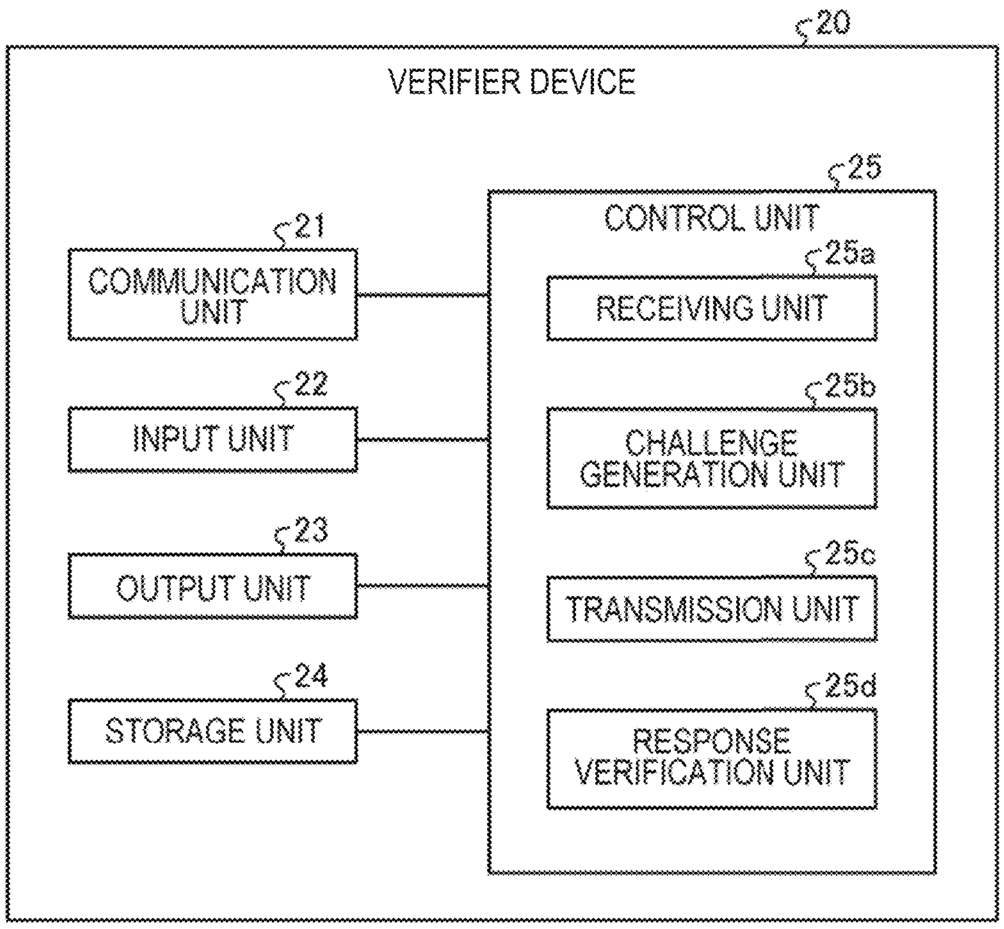
FIG. 3 is a block diagram illustrating a configuration example of a verifier device according to the first embodiment.
Figure 4:
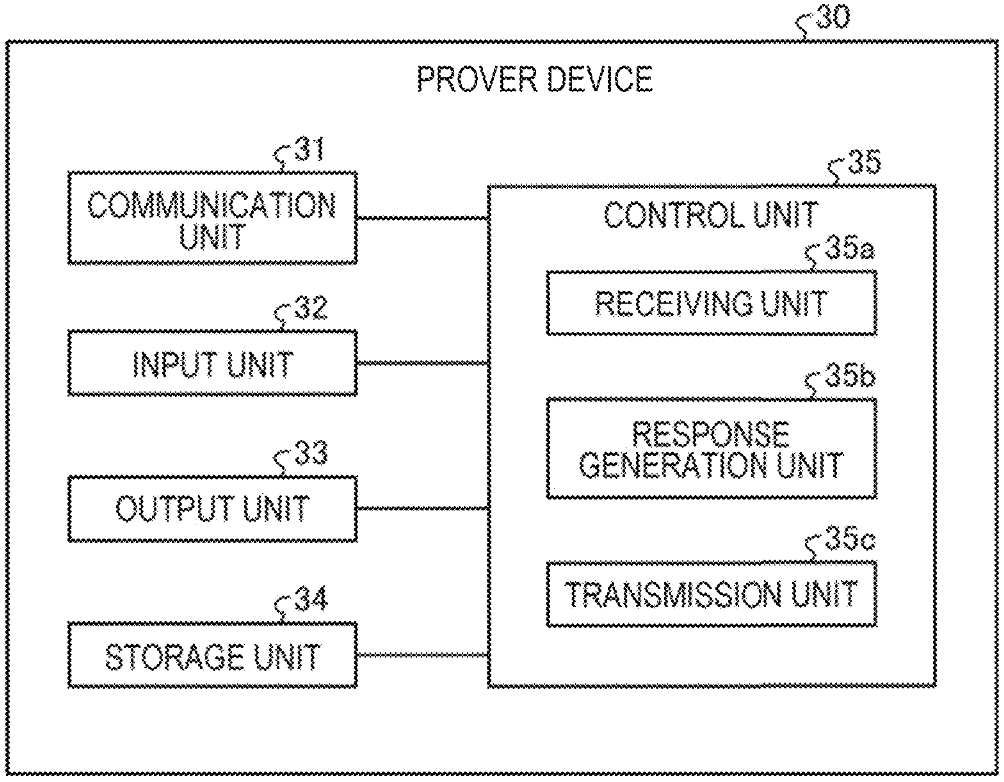
FIG. 4 is a block diagram illustrating a configuration example of a prover device according to the first embodiment.

Configuration examples of the firmware generation device 10, the verifier device 20, and the prover device 30 according to the first embodiment will be described in detail with reference to FIGS. 2 to 4. FIG. 2 is a block diagram illustrating the configuration example of the firmware generation device 10 according to the first embodiment. FIG. 3 is a block diagram illustrating the configuration example of the verifier device 20 according to the first embodiment. FIG. 4 is a block diagram illustrating the configuration example of the prover device 30 according to the first embodiment.

(2-1. Configuration Example of Firmware Generation Device 10)

The configuration example of the firmware generation device 10 according to the first embodiment will be described in detail with reference to FIG. 2. The firmware generation device 10 includes a communication unit 11, an input unit 12, an output unit 13, a storage unit 14, and a control unit 15. Note that the firmware generation device 10 may not include the input unit 12 or the output unit 13.

(2-1-1. Communication Unit 11)

The communication unit 11 is implemented by using, for example, a network interface card (NIC). The communication unit 11 is connected to a predetermined communication network in a wired or wireless manner and transmits/receives information to/from various devices.

(2-1-2. Input Unit 12)

The input unit 12 is implemented by, for example, a keyboard or a mouse. The input unit 12 receives various operations from the administrator or the like of the firmware generation device 10.

(2-1-3. Output Unit 13)

The output unit 13 is implemented by, for example, a liquid crystal display. The output unit 13 displays various types of information.

(2-1-4. Storage Unit 14)

The storage unit 14 is implemented by, for example, a semiconductor memory element such as a random access memory (RAM) or a flash memory or a storage device such as a hard disk or an optical disc. The storage unit 14 stores various types of information referred to when the control unit 15 operates and stores various types of information acquired when the control unit 15 operates.

(2-1-5. Control Unit 15)

The control unit 15 controls the entire firmware generation device 10. The control unit 15 includes a receiving unit 15*a*, a firmware generation unit 15*b*, and a transmission unit 15*c*. The control unit 15 is, for example, an electronic circuit such as a central processing unit (CPU) or a micro processing unit (MPU) or an integrated circuit such as an application specific integrated circuit (ASIC) or a field programmable gate array (FPGA).

(2-1-5-1. Receiving Unit 15*a*)

The receiving unit 15*a* receives various types of information regarding firmware. For example, the receiving unit 15*a* receives a firmware download request from the user U who is the administrator of the authentication system 100.

(2-1-5-2. Firmware Generation Unit 15*b*)

The firmware generation unit 15*b* generates model common firmware used for challenge-response authentication by writing a predetermined random number and index information indicating an area to be subjected to hash calculation in a free space of the firmware. For example, the firmware generation unit 15*b* generates the model common firmware by generating the random number common to each model of the prover device and the index information including a head address and size of a memory area to be subjected to hash calculation and writing the random number and the index information in the free space.

Meanwhile, the firmware generation unit 15*b* stores the generated model common firmware in the storage unit 14.

(2-1-5-3. Transmission Unit 15*c*)

The transmission unit 15*c* transmits various types of information regarding firmware. For example, the transmission unit 15*c* transmits the generated firmware in response to the firmware download request from the user U who is the administrator of the authentication system 100.

(2-2. Configuration Example of Verifier Device 20)

A configuration example of the verifier device 20 according to the first embodiment will be described in detail with reference to FIG. 3. The verifier device 20 includes a communication unit 21, an input unit 22, an output unit 23, a storage unit 24, and a control unit 25. Note that the verifier device 20 may not include the input unit 22 or the output unit 23.

(2-2-1. Communication Unit 21)

The communication unit 21 is implemented by, for example, an NIC. The communication unit 21 is connected to a predetermined communication network in a wired or wireless manner and transmits/receives information to/from various devices.

(2-2-2. Input Unit 22)

The input unit 22 is implemented by, for example, a keyboard or a mouse. The input unit 22 receives various operations from an administrator or the like of the verifier device 20.

(2-2-3. Output Unit 23)

The output unit 23 is implemented by, for example, a liquid crystal display. The output unit 23 displays various types of information.

(2-2-4. Storage Unit 24)

The storage unit 24 is implemented by, for example, a semiconductor memory element such as a RAM or a flash memory or a storage device such as a hard disk or an optical disc. The storage unit 24 stores various types of information referred to when the control unit 25 operates and stores various types of information acquired when the control unit 25 operates.

(2-2-5. Control Unit 25)

The control unit 25 controls the entire verifier device 20. The control unit 25 includes a receiving unit 25*a*, a challenge generation unit 25*b*, a transmission unit 25*c*, and a response verification unit 25*d*. The control unit 25 is, for example, an electronic circuit such as a CPU or an MPU or an integrated circuit such as an ASIC or an FPGA.

(2-2-5-1. Receiving Unit 25*a*)

The receiving unit 25*a* receives various types of information. For example, the receiving unit 25*a* receives the model common firmware and the information specific to the prover device 30 and stores the received firmware and information in the storage unit 24. The receiving unit 25*a* also receives a registration request and a response from the prover device 30.

(2-2-5-2. Challenge Generation Unit 25*b*)

The challenge generation unit 25*b* generates a challenge for the prover device 30 on the basis of the model common firmware held by the verifier device 20. For example, the challenge generation unit 25*b* reads target data of hash calculation by using the index information included in the model common firmware held by the verifier device 20, executes hash calculation by using the information specific to the prover device 30 and the target data of hash calculation, and generates a challenge.

(2-2-5-3. Transmission Unit 25*c*)

The transmission unit 25*c* transmits various types of information. For example, the transmission unit 25*c* transmits the generated challenge to the prover device 30.

(2-2-5-4. Response Verification Unit 25*d*)

The response verification unit 25*d* verifies the response received from the prover device 30. For example, the response verification unit 25*d* verifies the response by a method described in [3. Specific Example of Each Kind of Processing in Authentication System 100] (3-1. Integrity Verification Processing) (3-1-6. Integrity Verification Processing of IoT Gateway) described later.

(2-3. Configuration Example of Prover Device 30)

A configuration example of the prover device 30 according to the first embodiment will be described in detail with reference to FIG. 4. The prover device 30 includes a communication unit 31, an input unit 32, an output unit 33, a storage unit 34, and a control unit 35. Note that the prover device 30 may not include the input unit 32 or the output unit 33.

(2-3-1. Communication Unit 31)

The communication unit 31 is implemented by, for example, an NIC. The communication unit 31 is connected to a predetermined communication network in a wired or wireless manner and transmits/receives information to/from various devices.

(2-3-2. Input Unit 32)

The input unit 32 is implemented by, for example, a keyboard or a mouse. The input unit 32 receives various operations from an administrator or the like of the prover device 30.

(2-3-3. Output Unit 33)

The output unit 33 is implemented by, for example, a liquid crystal display. The output unit 33 displays various types of information.

(2-3-4. Storage Unit 34)

The storage unit 34 is implemented by, for example, a semiconductor memory element such as a RAM or a flash memory or a storage device such as a hard disk or an optical disc. The storage unit 34 stores various types of information referred to when the control unit 35 operates and stores various types of information acquired when the control unit 35 operates.

(2-3-5. Control Unit 35)

The control unit 35 controls the entire prover device 30. The control unit 35 includes a receiving unit 35*a*, a response generation unit 35*b*, and a transmission unit 35*c*. The control unit 35 is, for example, an electronic circuit such as a CPU or an MPU or an integrated circuit such as an ASIC or an FPGA.

(2-3-5-1. Receiving Unit 35*a*)

The receiving unit 35*a* receives various types of information. For example, the receiving unit 35*a* receives the model common firmware. The receiving unit 35*a* also receives the challenge from the verifier device 20.

(2-3-5-2. Response Generation Unit 35*b*)

The response generation unit 35*b* generates a response to the verifier device 20 on the basis of the model common firmware held by the prover device 30. For example, the response generation unit 35*b* reads target data of hash calculation by using the index information included in the model common firmware installed in the prover device 30, executes hash calculation by using the information specific to the prover device 30 and the target data of hash calculation, and generates a response to the verifier device 20.

(2-3-5-3. Transmission Unit 35*c*)

The transmission unit 35*c* transmits various types of information. For example, the transmission unit 35*c* transmits a registration request and the generated response to the verifier device 20.

[3. Specific Example of Each Kind of Processing in Authentication System 100]

A specific example of each kind of processing in the authentication system 100 according to the first embodiment will be described with reference to FIGS. 5 to 11. Hereinafter, integrity verification processing, hash calculation processing, a communication network, and authentication processing will be described in this order.

(3-1. Integrity Verification Processing)

Figure 5:
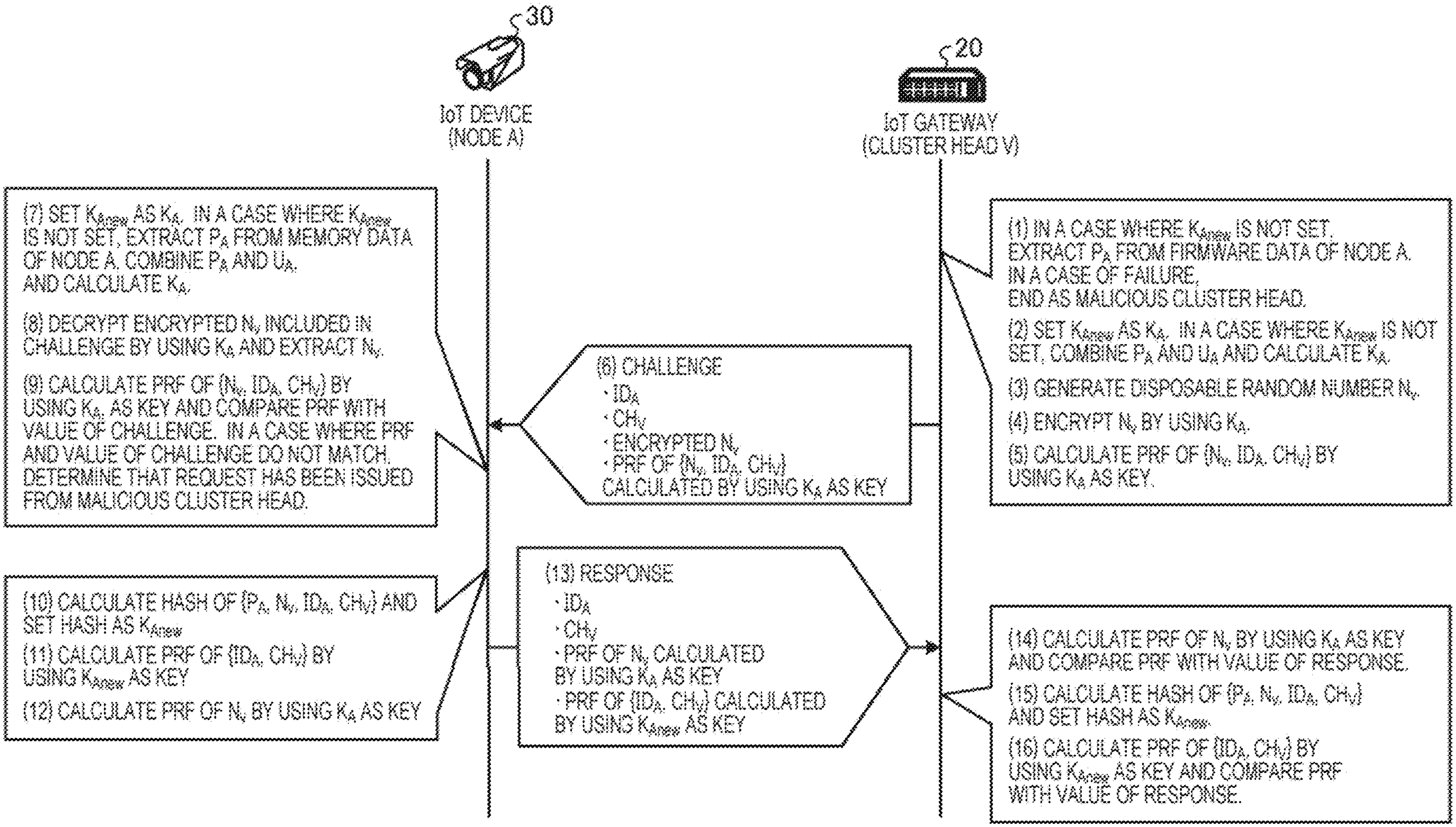
FIG. 5 illustrates an example of integrity verification according to the first embodiment.

A specific example of the integrity verification processing in the authentication system 100 will be described with reference to FIG. 5. FIG. 5 illustrates an example of integrity verification according to the first embodiment. Hereinafter, a specific example where an IoT gateway (cluster head V) is employed as the verifier device 20 and an IoT device (node A) is employed as the prover device 30 will be described. Further, hereinafter, $CH_V$ denotes an ID of the cluster head V, $ID_A$ denotes an ID of the node A, $N_v$ denotes a nonce generated by the cluster head V, PA denotes target data of hash calculation in the node A, UA denotes information specific to the node A, $K_A$ denotes a hash value of data obtained by combining PA and UA, and PRF denotes a pseudo-random function.

(3-1-1. Challenge Generation Processing of IoT Gateway)

First, in a case where $K_{Anew}$ is not set, the IoT gateway extracts PA from firmware data of the node A. At this time, in a case where the IoT gateway fails, the IoT gateway ends as a malicious cluster head (see (1) in FIG. 5). Next, in a case where $K_{Anew}$ is set, the LOT gateway sets $K_{Anew}$ as $K_A$. At this time, in a case where $K_{Anew}$ is not set, the IoT gateway combines PA and UA and calculates $K_A$ (see (2) in FIG. 5). Then, the IoT gateway generates a disposable random number $N_v$ (see (3) in FIG. 5). Further, the IoT gateway encrypts $N_v$ by using $K_A$ (see (4) in FIG. 5). Then, the IoT gateway calculates a PRF of $\{N_v, ID_A, CH_V\}$ by using $K_A$ as a key (see (5) in FIG. 5).

(3-1-2. Challenge Transmission Processing of IoT Gateway)

The IoT gateway transmits, as a challenge, $ID_A$, $CH_V$, the encrypted $N_v$, and the PRF of $\{N_v, ID_A, CH_V\}$ calculated by using $K_A$ as keys (see (6) in FIG. 5).

(3-1-3. Response Generation Processing 1 of IoT Device)

First, in a case where $K_{Anew}$ is set, the IoT device sets $K_{Anew}$ as $K_A$. At this time, in a case where $K_{Anew}$ is not set, the IoT device extracts PA from memory data of the node A, combines PA and UA, and calculates $K_A$ (see (7) in FIG. 5). Next, the IoT device decrypts the encrypted $N_v$ included in the challenge by using $K_A$ and extracts $N_v$ (see (8) in FIG. 5). Then, the IoT device calculates a PRF of $\{N_v, ID_A, CH_V\}$ by using $K_A$ as a key and compares the PRF with a value of the challenge. At this time, in a case where the PRF and the value of the challenge do not match, the IoT device determines that a request has been issued from a malicious cluster head (see (9) in FIG. 5).

(3-1-4. Response Generation Processing 2 of IoT Device)

Then, the IoT device calculates a hash of $\{PA, N_v, ID_A, CH_V\}$ and sets the hash as $K_{Anew}$ (see (10) in FIG. 5). Further, the IoT device calculates a PRF of $\{ID_A, CH_V\}$ by using $K_{Anew}$ as a key (see (11) in FIG. 5). Then, the IoT device calculates a PRF of $N_v$ by using $K_A$ as a key (see (12) in FIG. 5).

(3-1-5. Response Transmission Processing of IoT Device)

The IoT device transmits, as a response, $ID_A$, $CH_V$, the PRF of $N_v$ calculated by using $K_A$ as a key, and the PRF of $\{ID_A, CH_V\}$ calculated by using $K_{Anew}$ as a key (see (13) in FIG. 5).

(3-1-6. Integrity Verification Processing of IoT Gateway)

The IoT gateway calculates a PRF of $N_v$ by using $K_A$ as a key and compares the PRF with a value of the response (see (14) in FIG. 5). Further, the IoT gateway calculates a hash of $\{PA, N_v, ID_A, CH_V\}$ and sets the hash as $K_{Anew}$ (see (15) in FIG. 5). Finally, the IoT gateway calculates a PRF of $\{ID_A, CH_V\}$ by using $K_{Anew}$ as a key and compares the PRF with the value of the response (see (16) in FIG. 5). The integrity is successfully verified in a case where both the PRF of $N_V$ calculated by using $K_A$ as a key and the PRF of $\{ID_A, CH_V\}$ calculated by using $K_{Anew}$ as a key match with the value of the response.

(3-2. Hash Calculation Processing)

Figure 6:
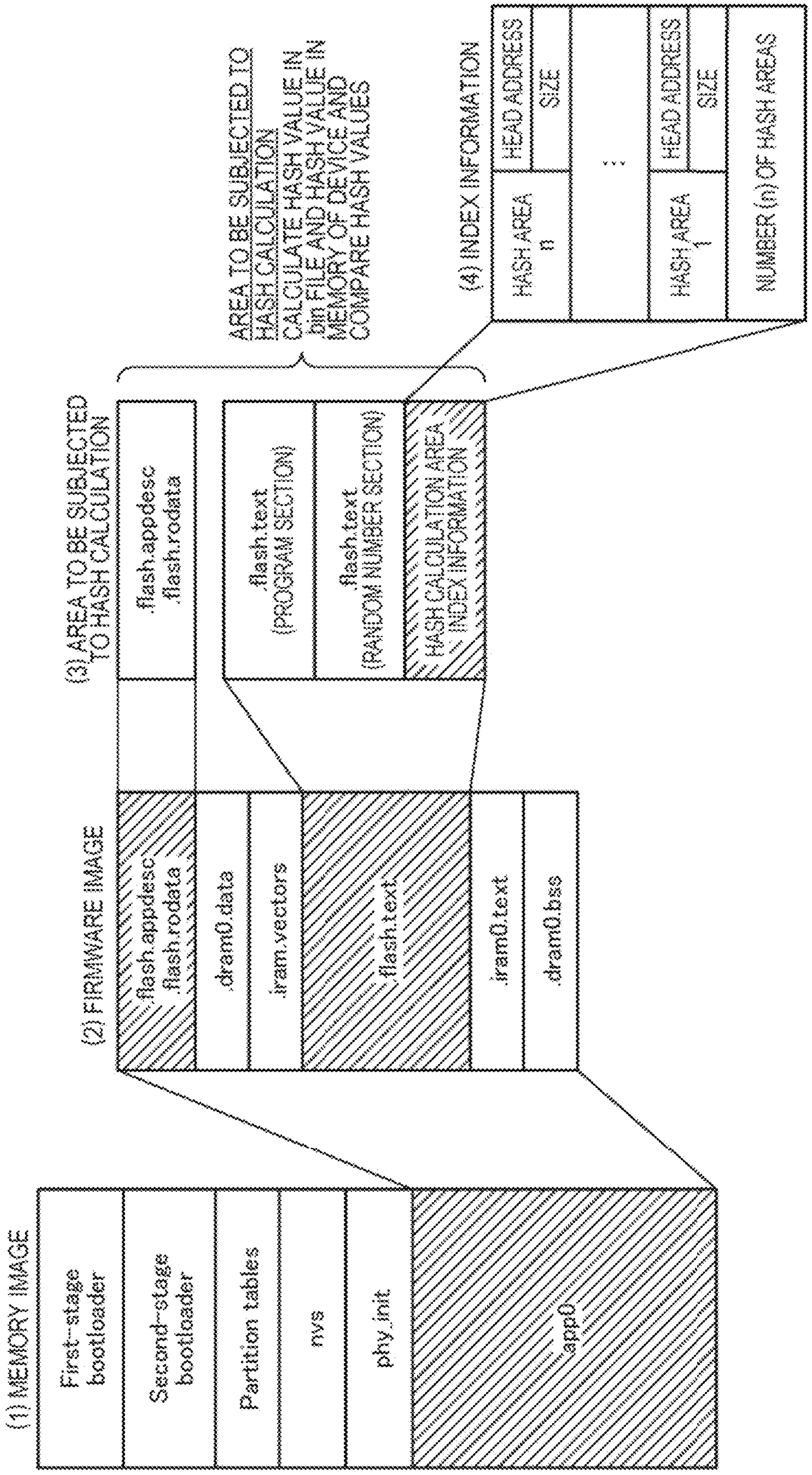
FIG. 6 illustrates an example of hash calculation according to the first embodiment.

A specific example of the hash calculation processing in the authentication system 100 will be described with reference to FIG. 6. FIG. 6 illustrates an example of hash calculation according to the first embodiment. Hereinafter, a hash calculation method will be described, and then specification of a hash calculation target will be described.

(3-2-1. Hash Calculation Method)

Hereinafter, hash calculation methods of the firmware generation device 10, the IoT gateway serving as the verifier device 20, and the IoT device serving as the prover device 30 according to the first embodiment will be described in this order.

(3-2-1-1. Calculation Method of Firmware Generation Device 10)

The firmware generation device 10 fills a free space of firmware with a random number (processing A1). At this time, it is difficult to input different random number values for each device in terms of operation, and thus a common random number is used for the same model. Further, the firmware generation device 10 causes the firmware to include index information indicating a memory range used for hash creation (processing A2).

(3-2-1-2. Calculation Method of IoT Gateway)

The IoT gateway registers in advance firmware of an IoT device to be connected (processing B1). Next, when receiving a registration request from the IoT device, the IoT gateway accesses the index information in the firmware and grasps a range of data to be subjected to hash calculation (processing B2). At this time, a position of the index information itself is described in an integrity verification program (verifier). Then, the IoT gateway accesses a file position to be subjected to hash calculation on the basis of the range of the data acquired in the processing B2, thereby acquiring data (processing B3). Then, the IoT gateway calculates a hash by adding information specific to the device (e.g. MAC address and device serial number) to the data acquired in the processing B3 (processing B4).

(3-2-1-3. Calculation Method of IoT Device)

When receiving a challenge from the IoT gateway, the IoT device accesses the index information in the memory and grasps a range of the memory to be subjected to hash calculation (processing C1). At this time, a position of the index information itself is described in an integrity verification program (prover). Next, the IoT device accesses a memory area to be subjected to hash calculation on the basis of the range of the memory acquired in the processing C1, thereby acquiring data (processing C2). Then, the IoT device calculates a hash by adding the information specific to the device (e.g. MAC address and device serial number) to the data acquired in the processing C2 (processing C3).

(3-2-2. Specification of Hash Calculation Target)

Hereinafter, specification of the hash calculation target according to the first embodiment in a case where a DFRobot DRF0478 is used as an example of the IoT device will be described in the following order: a memory image, a firmware image, the area to be subjected to hash calculation, and the index information.

(3-2-2-1. Memory Image)

As illustrated in (1) in FIG. 6, part of data in a memory image corresponds to a firmware image. In the example of (1) in FIG. 6, "app0" in the memory image corresponds to the firmware image. At this time, random number data and information regarding the area to be subjected to hash calculation are added in a ".flash.text" segment in a firmware image portion "App Image(.bin)" loaded into an "app0" partition.

(3-2-2-2. Firmware Image)

As illustrated in (2) in FIG. 6, part of data in the firmware image corresponds to the area to be subjected to hash calculation. In the example of (2) in FIG. 6, ".flash.appdesc.flash.rodata" and ".flash.text" in the firmware image correspond to the area to be subjected to hash calculation.

(3-2-2-3. Area to be Subjected to Hash Calculation)

As illustrated in (3) in FIG. 6, the above ".flash.appdesc", ".flash.rodata", and ".flash.text" are the area to be subjected to hash calculation. The ".flash.text" segment includes a program section and a random number data section, and the random number data section further includes hash calculation area index information. At this time, the IoT gateway calculates a hash value on the basis of the firmware image, and the IoT device calculates a hash value on the basis of the memory image in the device and compares the hash values.

(3-2-2-4. Index Information)

As illustrated in (4) in FIG. 6, the index information includes the number (n) of hash areas and information regarding a "head address" and "size" of each of a "hash area 1", . . . , and a "hash area n".

(3-3. Communication Network)

Figure 7:
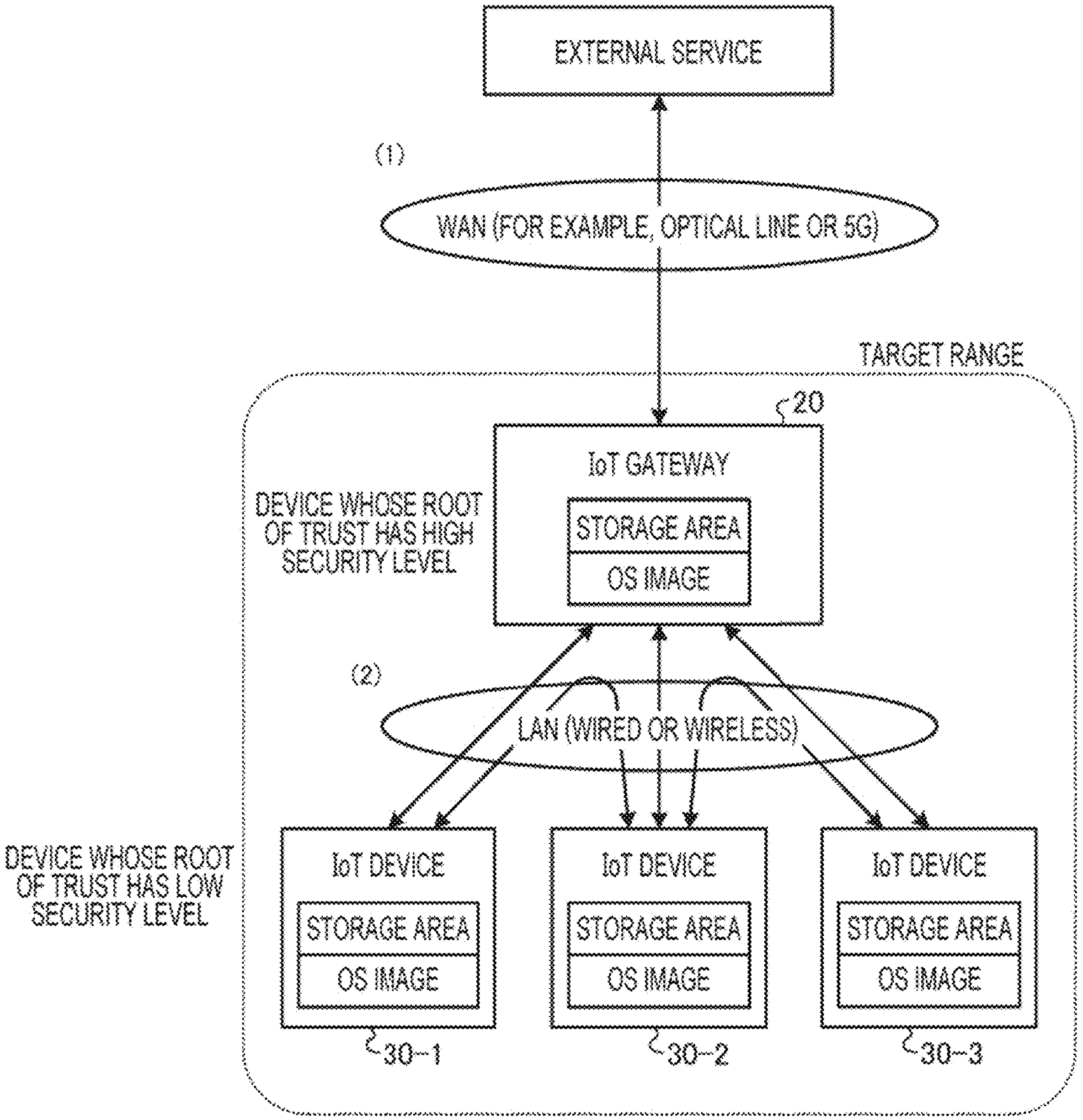
FIG. 7 illustrates an example of an overview of a communication network according to the first embodiment.
Figure 8:
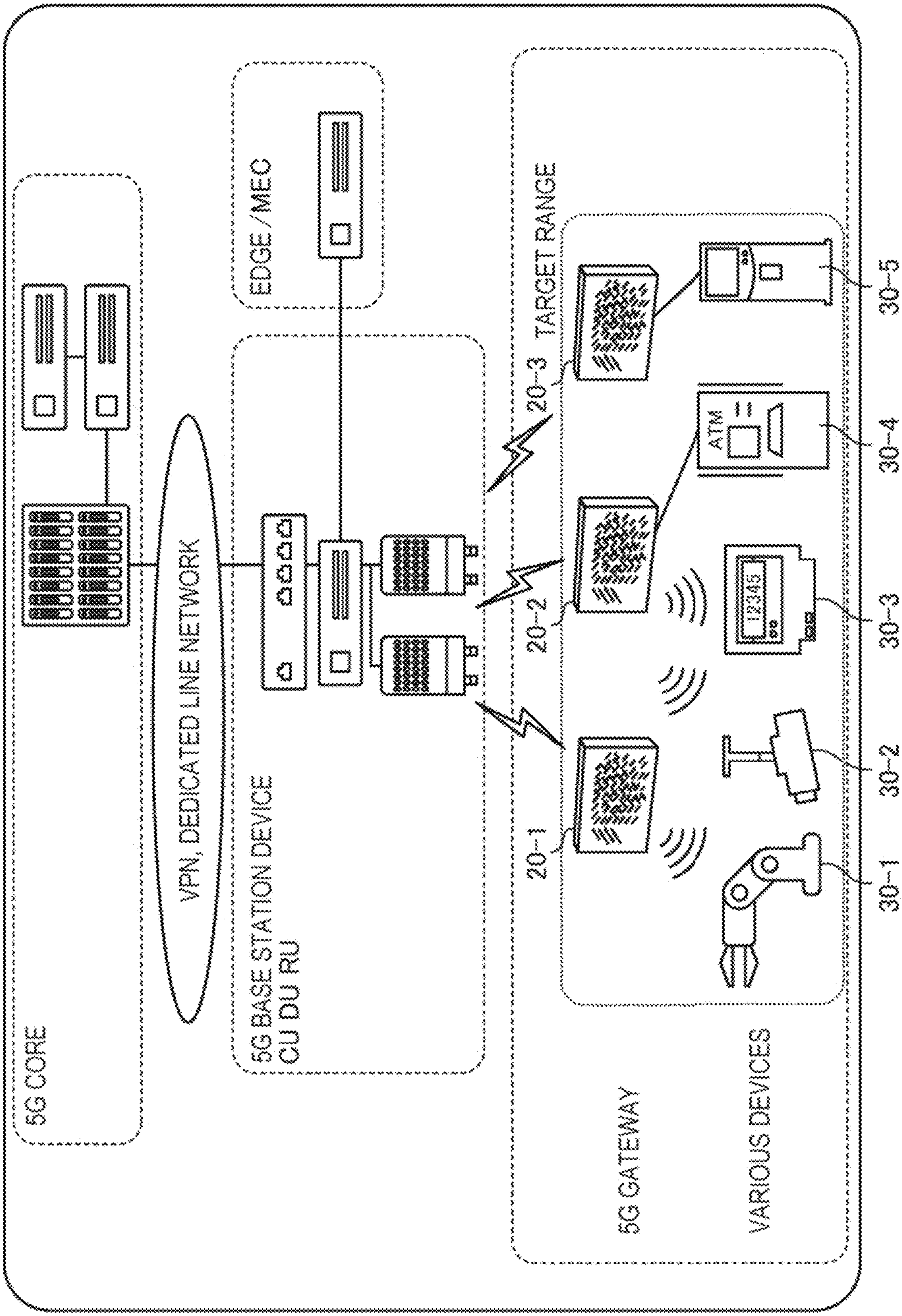
FIG. 8 illustrates a specific example of the communication network according to the first embodiment.

A specific example of the communication network in the authentication system 100 will be described with reference to FIGS. 7 to 8. FIG. 7 illustrates an example of an overview of the communication network according to the first embodiment. FIG. 8 illustrates a specific example of the communication network according to the first embodiment. Hereinafter, the overview of the communication network in the authentication system 100 and the specific example thereof will be described in this order.

(3-3-1. Overview of Communication Network)

The overview of the communication network in the authentication system 100 will be described with reference to FIG. 7. As illustrated in FIG. 7, the IoT gateway serving as the verifier device 20 is a device whose root of trust has a high security level. IoT devices serving as the prover devices 30 (30-1, 30-2, and 30-3) are devices whose root of trust has a low security level. The IoT gateway is connected to an external service via a wide area network (WAN) such as an optical line or fifth generation (5G) (see (1) in FIG. 7). Further, the IoT gateway is connected to the IoT devices via a wired or wireless local area network (LAN) (see (2) in FIG. 7).

(3-3-2. Specific Example of Communication Network)

A specific example of the communication network in the authentication system 100 will be described with reference to FIG. 8. As illustrated in FIG. 8, the IoT gateways serving as the verifier devices 20 (20-1, 20-2, and 20-3) can be implemented by using, for example, a 5G gateway. IoT devices serving as the prover devices 30 (30-1, 30-2, 30-3, 30-4, and 30-5) can be implemented by using, for example, a security camera and an automated teller machine (ATM). The IoT gateways can be connected to a 5G core by a virtual private network (VPN) or a dedicated line network via a 5G base station device, for example.

(3-4. Authentication Processing)

Figure 9:
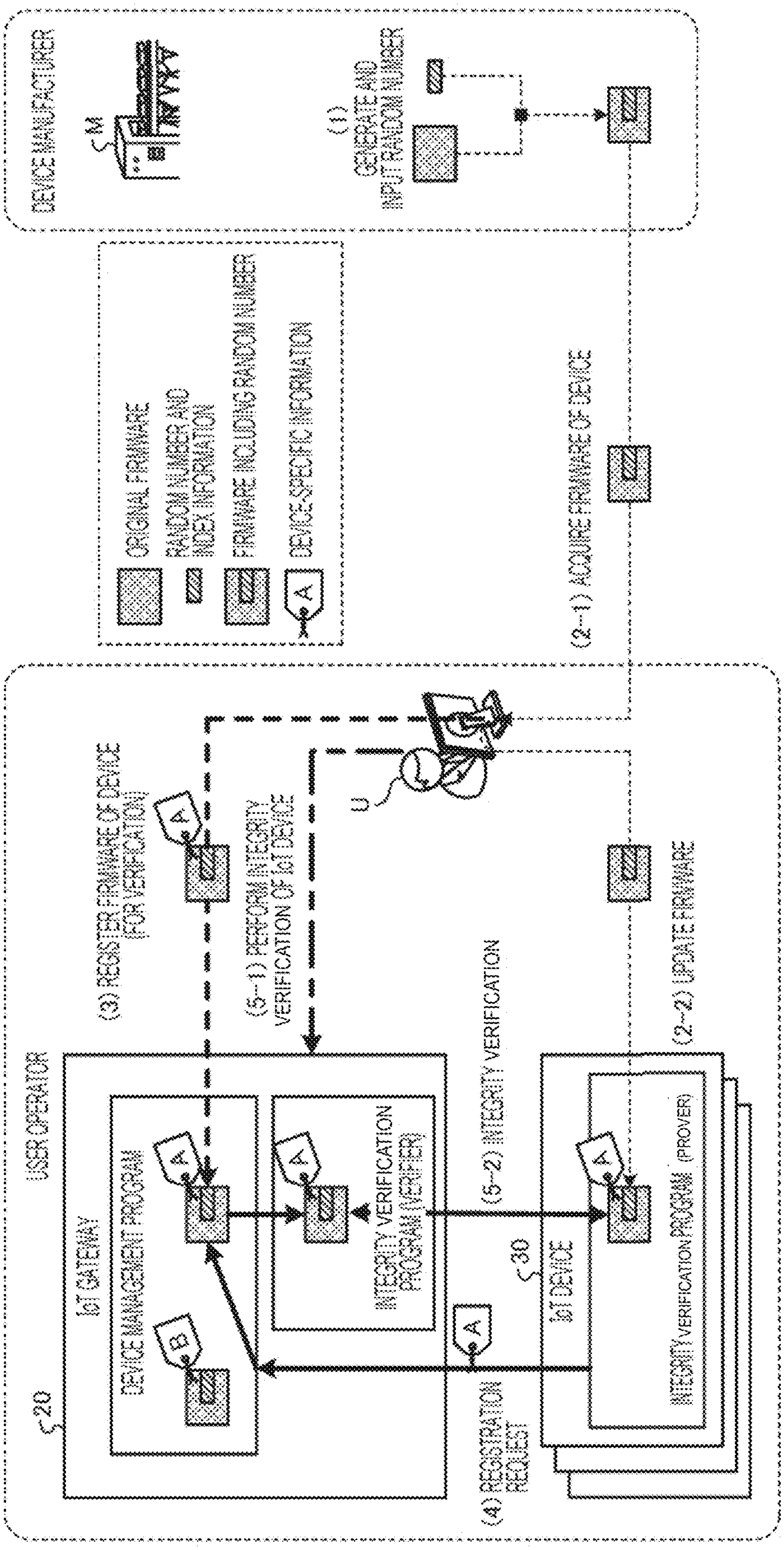
FIG. 9 illustrates an example of an overview of authentication processing according to the first embodiment.
Figure 10:
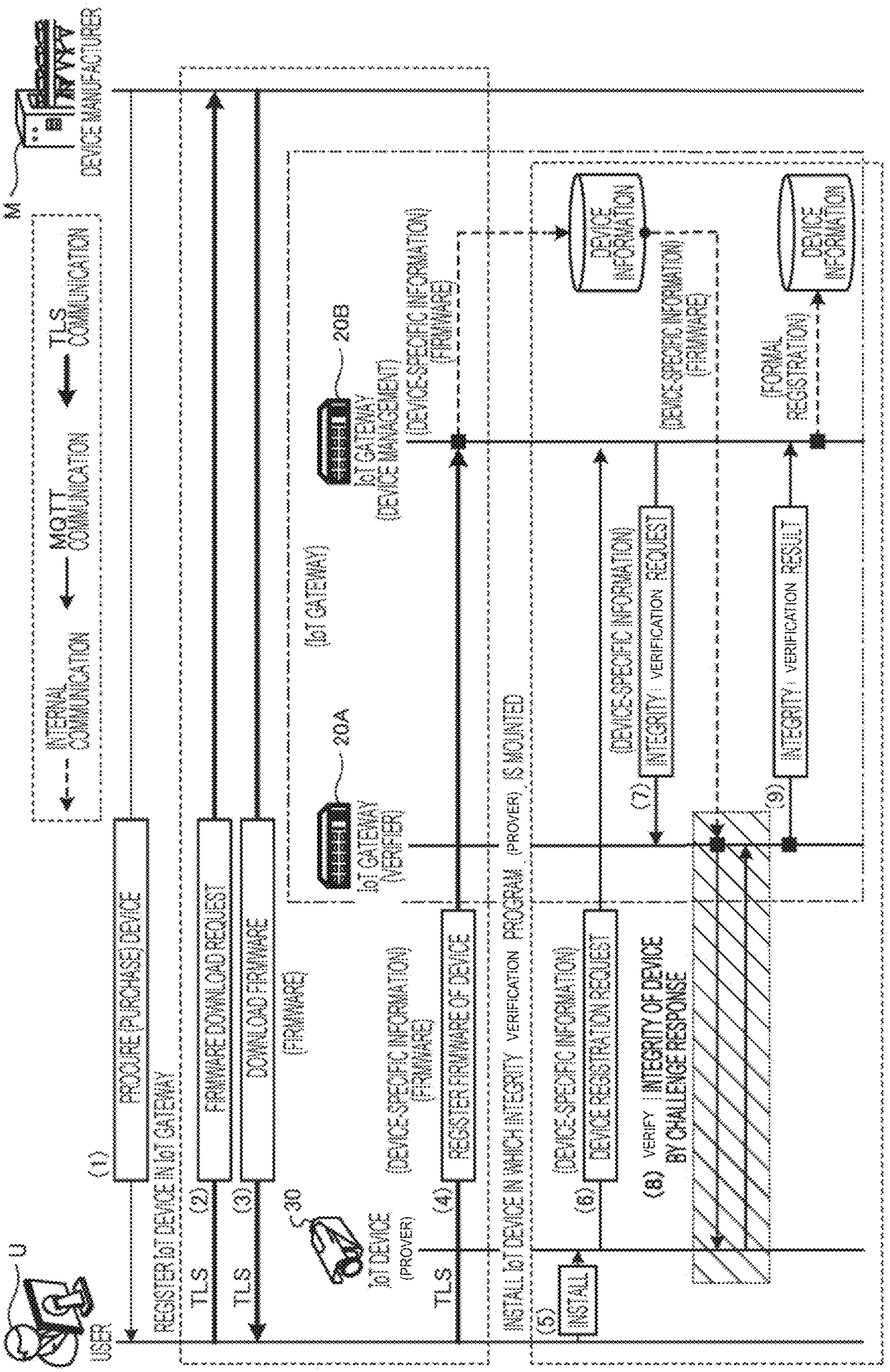
FIG. 10 illustrates a specific example of device registration in the authentication processing according to the first embodiment.
Figure 11:
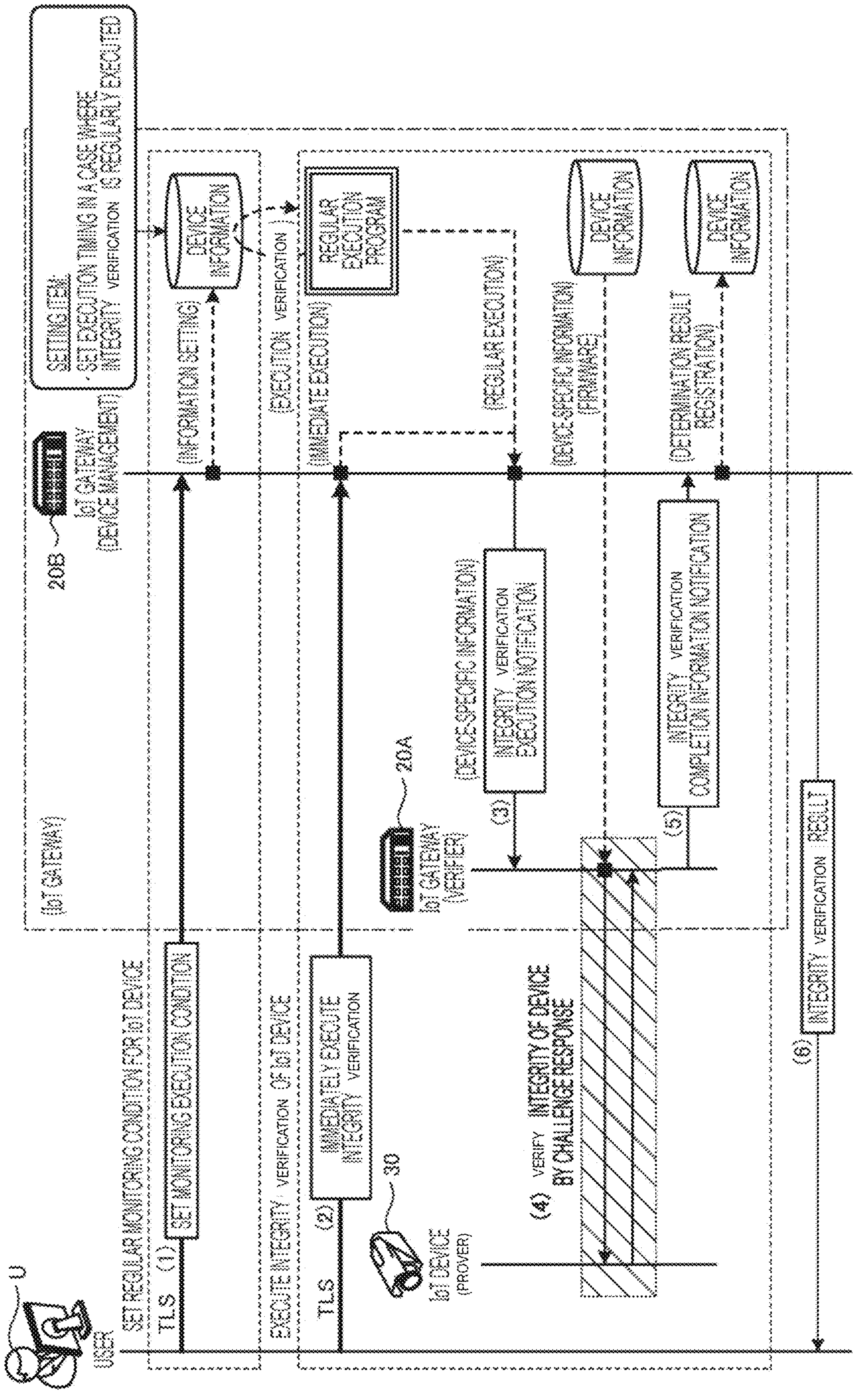
FIG. 11 illustrates a specific example of integrity verification in the authentication processing according to the first embodiment.

A specific example of the authentication processing in the authentication system 100 will be described with reference to FIGS. 9 to 11. FIG. 9 illustrates an example of an overview of the authentication processing according to the first embodiment. FIG. 10 illustrates a specific example of device registration in the authentication processing according to the first embodiment. FIG. 11 illustrates a specific example of integrity verification in the authentication processing according to the first embodiment. Hereinafter, the overview of the authentication processing in the authentication system 100, the specific example of device registration, and the specific example of integrity verification will be described in this order.

(3-4-1. Overview of Authentication Processing)

The overview of the authentication processing in the authentication system 100 will be described with reference to FIG. 9. As illustrated in FIG. 9, first, the device manufacturer M creates firmware including a random number and index information (see (1) in FIG. 9). Next, the user operator U acquires the firmware of the device by using an existing mechanism provided by the device manufacturer M and updates the firmware of the device (see (2-1) and (2-2) in FIG. 9). Then, the user operator U arranges the firmware of the device in the IoT gateway in association with device-specific information (see (3) in FIG. 9). Then, the IoT device transmits a formal registration request to the IoT gateway (see (4) in FIG. 9). At this time, the IoT gateway verifies the integrity of the device by using the device-specific information and firmware registered in advance and formally registers the device when succeeding in the integrity verification. In the integrity verification, the IoT gateway reads hash calculation target data from the firmware image of the IoT device, and the IoT device reads target data of hash calculation from the memory image, generates a hash together with the device-specific information, and verifies the integrity (see (5) in FIG. 9).

(3-4-2. Specific Example of Device Registration)

A specific example of device registration in the authentication system 100 will be described with reference to FIG. 10. Here, among arrows in FIG. 10, a thick arrow indicates transport layer security (TLS) communication, a medium-thickness arrow indicates message queueing telemetry transport (MQTT) communication, a broken arrow indicates internal communication, and a thin arrow indicates other kinds of processing. Note that the communication system is merely an example, and other systems may be used.

First, the user U procures (purchases) an IoT device from the device manufacturer M (see (1) in FIG. 10). Next, the user U issues a firmware download request to the device manufacturer M (see (2) in FIG. 10), and, in response to the request, the device manufacturer M transmits firmware to the user U. Thus, the user U downloads the firmware (see (3) in FIG. 10). Further, the user U transmits information specific to the IoT device 30 and the firmware to an IoT gateway (device management) 20B that manages the IoT device and registers the firmware of the device (see (4) in FIG. 10). At this time, the IoT gateway (device management) 20B stores the received information specific to the IoT device 30 and firmware in a device information database. The firmware of the IoT device is registered in the IoT gateway through the above processing (2) to (4) in FIG. 10.

The user U installs an IoT device (prover) 30 that proves the integrity (see (5) in FIG. 10). Next, the IoT device 30 transmits the information specific to the IoT device 30 to the IoT gateway (device management) 20B and issues a registration request of the IoT device 30 (see (6) in FIG. 10). Then, the IoT gateway (device management) 20B transmits the information specific to the IoT device 30 to an IoT gateway (verifier) 20A that verifies the integrity and issues a verification request of the integrity of the IoT device (prover) 30 (see (7) in FIG. 10). The IoT gateway (verifier) 20A acquires the corresponding firmware from the device information database by using the information specific to the IoT device 30 as a key. Then, the IoT gateway (verifier) 20A verifies the integrity of the IoT device (prover) 30 by challenge-response authentication between the IoT gateway (verifier) 20A and the IoT device (prover) 30 described above in (3-1. Integrity Verification Processing) (see (8) in FIG. 10). Further, the IoT gateway (verifier) 20A transmits an integrity verification result to the IoT gateway (device management) 20B (see (9) in FIG. 10). Finally, the IoT gateway (device management) 20B stores formal registration of the IoT device (prover) 30 in the device information database. The IoT device whose integrity has been verified is installed through the processing (5) to (9) in FIG. 10.

(3-4-3. Specific Example of Integrity Verification)

A specific example of the integrity verification in the authentication system 100 will be described with reference to FIG. 11. Here, among arrows in FIG. 11, a thick arrow indicates TLS communication, a medium-thickness arrow indicates MQTT communication, a broken arrow indicates internal communication, and a thin arrow indicates other kinds of processing. Note that the communication system is merely an example, and other systems may be used.

First, the user U can set a monitoring execution condition for the IoT gateway (device management) 20B (see (1) in FIG. 11). At this time, the IoT gateway (device management) 20B stores, in the device information database, a received setting of an execution timing in a case where integrity verification is regularly executed. A regular monitoring condition of the IoT device (prover) 30 is set through the above processing (1) in FIG. 11.

The user U immediately executes integrity verification of the IoT gateway (device management) 20B (see (2) in FIG. 11). At this time, the IoT gateway (device management) 20B issues a notification of execution of the integrity verification to the IoT gateway (verifier) 20A (see (3) in FIG. 11). Note that, also when the integrity verification is regularly executed, the IoT gateway (device management) 20B issues a notification of execution of the integrity verification to the IoT gateway (verifier) 20A on the basis of the monitoring execution condition. The IoT gateway (verifier) 20A acquires the corresponding firmware from the device information database by using the information specific to the IoT device 30 (prover) as a key. Then, the IoT gateway (verifier) 20A verifies the integrity of the IoT device (prover) 30 by challenge-response authentication between the IoT gateway (verifier) 20A and the IoT device (prover) 30 described above in (3-1. Integrity Verification Processing) (see (4) in FIG. 11). Further, the IoT gateway (verifier) 20A transmits an integrity verification result to the IoT gateway (device management) 20B (see (5) in FIG. 11). Then, the IoT gateway (device management) 20B stores determination result registration of the IoT device (prover) 30 in the device information database. The integrity verification of the IoT device is executed through the above processing (2) to (5) in FIG. 11. Finally, the IoT gateway (device management) 20B transmits an integrity verification result to the user U (see (6) in FIG. 11).

[4. Flow of Authentication Processing in Authentication System 100]

Figure 12:
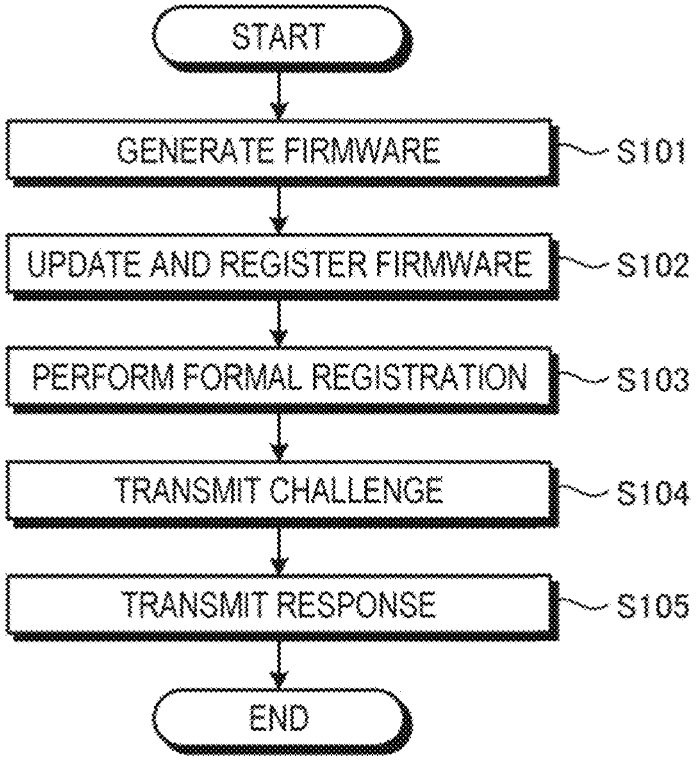
FIG. 12 is a flowchart showing an example of a flow of the authentication processing according to the first embodiment.

A flow of the authentication processing in the authentication system 100 according to the first embodiment will be described with reference to FIG. 12. FIG. 12 is a flowchart showing an example of the flow of the authentication processing according to the first embodiment. The following steps S101 to S105 can be performed in different orders. Among the following steps S101 to S105, part of the processing may be omitted.

First, the firmware generation device 10 generates model common firmware (step S101). For example, the firmware generation device 10 generates model common firmware used for challenge-response authentication by writing a predetermined random number and index information indicating an area to be subjected to hash calculation in a free space of the firmware.

Second, the firmware generation device 10 updates and registers the model common firmware (step S102). For example, the firmware generation device 10 updates and registers the model common firmware by transmitting the model common firmware to the verifier device 20 and the prover device 30.

Third, the verifier device 20 formally registers the prover device 30 (step S103). For example, the verifier device 20 formally registers the prover device 30 by challenge-response authentication using the information specific to the prover device 30 and the firmware.

Fourth, the verifier device 20 transmits a challenge to the prover device 30 (step S104). For example, the verifier device 20 reads target data of hash calculation by using the index information included in the model common firmware held by the verifier device 20, executes hash calculation by using the information specific to the prover device 30 and the target data of hash calculation, generates a challenge for the prover device 30, and transmits the challenge.

Fifth, the prover device 30 transmits a response to the verifier device 20 (step S105). For example, the prover device 30 reads target data of hash calculation by using the index information included in the model common firmware held by the prover device 30, executes hash calculation by using the information specific to the prover device 30 and the target data of hash calculation, generates a response to the verifier device 20, and transmits the response.

5. Effects of First Embodiment

Finally, effects of the first embodiment will be described. Hereinafter, effects 1 to 4 of the processing according to the first embodiment will be described.

(5-1. Effect 1)

In the above first embodiment, the firmware generation device 10 generates model common firmware used for challenge-response authentication by writing a predetermined random number and index information indicating an area to be subjected to hash calculation in a free space of the firmware, the verifier device 20 generates a challenge for the prover device 30 on the basis of the model common firmware held by the verifier device 20, and the prover device 30 generates a response to the verifier device 20 on the basis of the model common firmware installed in the prover device 30. This makes it possible to effectively verify the integrity of IoT devices by using the model common firmware.

(5-2. Effect 2)

In the above first embodiment, the firmware generation device 10 generates the model common firmware by generating the predetermined random number common to each model of the prover device 30 and the index information including a head address and size of a memory area to be subjected to hash calculation and writing the predetermined random number and the index information in the free space. Therefore, because the effective model common firmware is generated, it is possible to more effectively verify the integrity of the IoT devices by using the model common firmware.

(5-3. Effect 3)

In the above first embodiment, the verifier device 20 reads target data of hash calculation by using the index information included in the model common firmware held by the verifier device 20, executes hash calculation by using the information specific to the prover device 30 and the target data of hash calculation, and generates a challenge for the prover device 30. Therefore, because the effective challenge is generated, it is possible to more effectively verify the integrity of the IoT devices by using the model common firmware.

(5-4. Effect 4)

In the above first embodiment, the prover device 30 reads target data of hash calculation by using the index information included in the model common firmware installed in the prover device 30, executes hash calculation by using the information specific to the prover device 30 and the target data of hash calculation, and generates a response to the verifier device 20. Therefore, because the effective response is generated, it is possible to more effectively verify the integrity of the IoT devices by using the model common firmware.

[System Configuration and the Like]

Each component of each illustrated device according to the above embodiments is functionally conceptual and does not necessarily need to be physically configured as illustrated. That is, a specific form of distribution and integration of each device is not limited to the illustrated form, and all or a part thereof can be functionally or physically distributed and integrated in any unit according to various loads, usage conditions, and the like. Further, all or some of the processing functions performed in each device can be implemented by a CPU and a program analyzed and executed by the CPU or can be implemented as hardware by wired logic.

In the processing described in the above embodiments, all or part of the processing described as being automatically performed can be manually performed, or all or part of the processing described as being manually performed can be automatically performed by a known method. Further, the processing procedures, the control procedures, the specific names, and the information including various kinds of data and parameters described in the above specification and drawings can be arbitrarily changed, unless otherwise specified.

[Program]

It is also possible to create a program in which the processing executed by the firmware generation device 10 described in the above embodiments is written in a language that can be executed by a computer. In this case, when the computer executes the program, it is possible to obtain effects similar to those of the above embodiments. Further, the program may be recorded in a computer-readable recording medium, and the program recorded in the recording medium may be read and executed by the computer, thereby implementing processing similar to that of the above embodiments.

Figure 13:
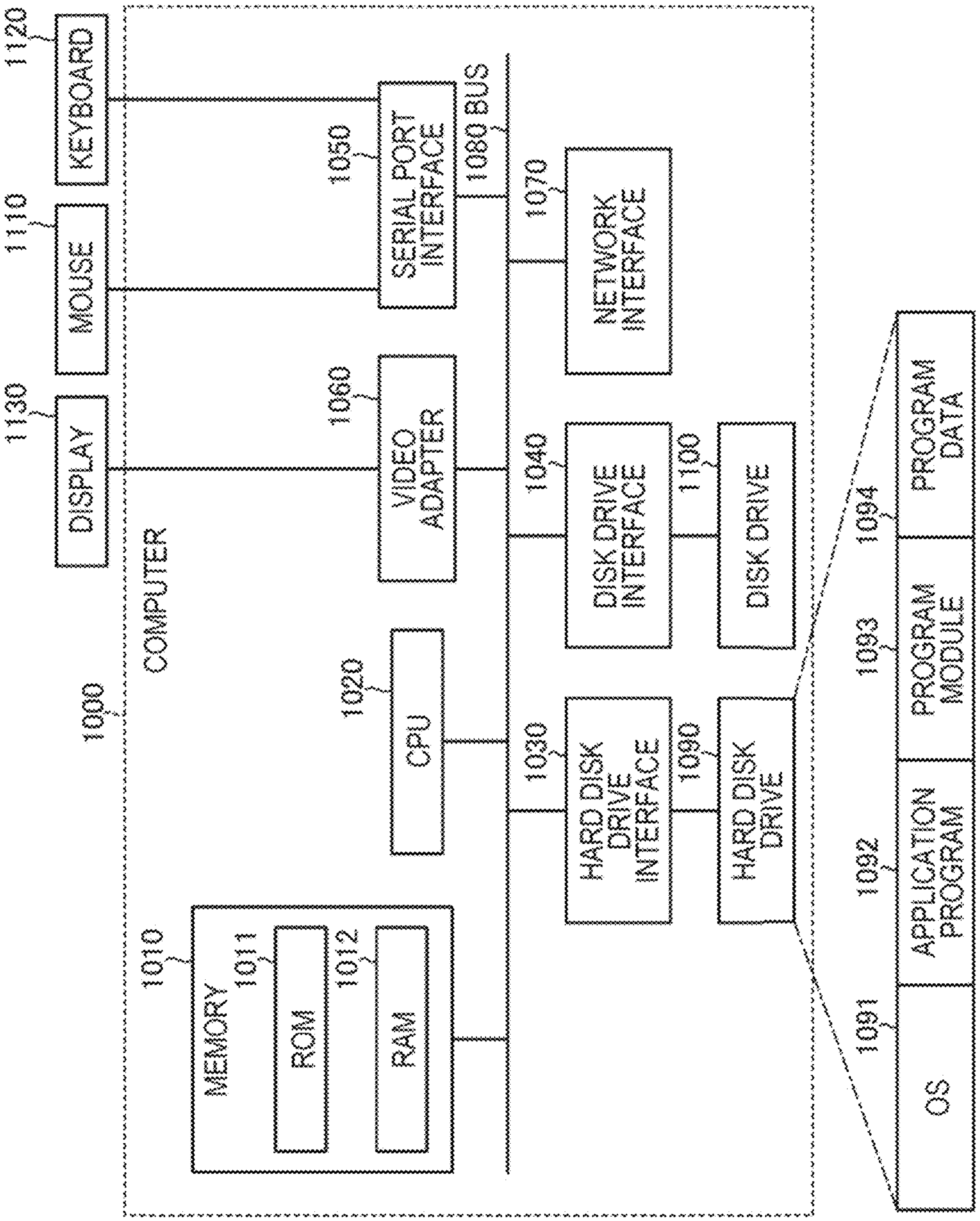
FIG. 13 illustrates a computer that executes a program.

FIG. 13 illustrates a computer that executes the program. As illustrated in FIG. 13, a computer 1000 includes, for example, a memory 1010, a CPU 1020, a hard disk drive interface 1030, a disk drive interface 1040, a serial port interface 1050, a video adapter 1060, and a network interface 1070. Those units are connected by a bus 1080.

As illustrated in FIG. 13, the memory 1010 includes a read only memory (ROM) 1011 and a RAM 1012. The ROM 1011 stores, for example, a boot program such as a basic input output system (BIOS). The hard disk drive interface 1030 is connected to a hard disk drive 1090 as illustrated in FIG. 13. The disk drive interface 1040 is connected to a disk drive 1100 as illustrated in FIG. 13. For example, a removable storage medium such as a magnetic disk or an optical disc is inserted into the disk drive 1100. The serial port interface 1050 is connected to, for example, a mouse 1110 and a keyboard 1120 as illustrated in FIG. 13. The video adapter 1060 is connected to, for example, a display 1130 as illustrated in FIG. 13.

The hard disk drive 1090 stores, for example, an OS 1091, an application program 1092, a program module 1093, and program data 1094 as illustrated in FIG. 13. That is, the above program is stored in, for example, the hard disk drive 1090 as a program module in which commands executed by the computer 1000 are written.

Various types of data described in the above embodiments are stored as program data in, for example, the memory 1010 and the hard disk drive 1090. The CPU 1020 reads the program module 1093 and the program data 1094 stored in the memory 1010 and the hard disk drive 1090 to the RAM 1012 as necessary and executes various processing procedures.

Note that the program module 1093 and the program data 1094 regarding the program are not limited to being stored in the hard disk drive 1090 and may be stored in, for example, a removable storage medium and read by the CPU 1020 via the disk drive or the like. Alternatively, the program module 1093 and the program data 1094 regarding the program may be stored in another computer connected via a network (e.g. local area network (LAN) or wide area network (WAN)) and be read by the CPU 1020 via the network interface 1070.

The above embodiments and modifications thereof are covered by the technique disclosed in the present application and fall within the scope of the inventions in the accompanying claims and their equivalents.

REFERENCE SIGNS LIST

10 Firmware generation device (generation device)
11, 21, 31 Communication unit
12, 22, 32 Input unit
13, 23, 33 Output unit
14, 24, 34 Storage unit
15, 25, 35 Control unit
15*a*, 25*a*, 35*a* Receiving unit
15*b* Firmware generation unit
15*c*, 25*c*, 35*c* Transmission unit
20 Verifier device (IoT gateway)
25*b* Challenge generation unit
25*d* Response verification unit
30 Prover device (IoT device)
35*b* Response generation unit
40 User operator terminal
100 Authentication system

The invention claimed is:

1. An authentication system, comprising:
a generation device configured to generate firmware;
a verifier device configured to verify integrity; and
a prover device configured to provide the integrity, wherein:
the generation device includes generation circuitry configured to generate model common firmware used for challenge-response authentication by writing, into a free space of the firmware, a predetermined random number common to each model of the prover device and index information including a head address and a size of a memory area to be subjected to hash calculation;
the verifier device includes verifier circuitry configured to:
generate a challenge for the prover device based on the basis of the model common firmware held by the verifier device, and
execute hash calculation by using target data specified by the index information included in the model common firmware and information specific to the prover device; and
the prover device includes prover circuitry configured to:
generate a response to the verifier device based on the model common firmware held by the prover device, and
execute hash calculation by using target data specified by the index information included in the model common firmware and information specific to the prover device.

2. The authentication system according to claim 1, wherein the generation circuitry is configured to generate the model common firmware by generating the random number common to each model of the prover device and the index information, and by writing the random number and the index information into the free space.

3. The authentication system according to claim 1, wherein the verifier circuitry is configured to read target data of hash calculation by using the index information included in the model common firmware held by the verifier device, execute the hash calculation by using the information specific to the prover device and the target data, and generate the challenge.

4. The authentication system according to claim 1, wherein the prover circuitry is configured to read the target data of hash calculation by using the index information included in the model common firmware held by the prover device, execute the hash calculation by using the information specific to the prover device and the target data, and generate the response.

5. A generation device comprising:
generation circuitry configured to generate model common firmware used for challenge-response authentication by writing, into a free space of the firmware, a predetermined random number common to each model of a prover device and index information including a head address and a size of a memory area to be subjected to hash calculation.

6. A generation method performed by a generation device, the generation method comprising:
generating model common firmware used for challenge-response authentication by writing, into a free space of the firmware, a predetermined random number common to each model of a prover device and index information including a head address and a size of a memory area to be subjected to hash calculation.

7. A non-transitory computer-readable recording medium storing therein a generation program for causing a computer to:
generate model common firmware used for challenge-response authentication by writing, into a free space of the firmware, a predetermined random number common to each model of a prover device and index information including a head address and a size of a memory area to be subjected to hash calculation.

8. The authentication system according to claim 1, wherein the information specific to the prover device includes at least one of a media access control (MAC) address and a device serial number of the prover device.

9. The authentication system according to claim 1, wherein the verifier device further includes response verification circuitry configured to verify the response received from the prover device.

10. The authentication system according to claim 1, wherein the index information includes a number of hash areas and, for each hash area, the head address and the size.

11. The authentication system according to claim 1, wherein the model common firmware includes a program section and a random number data section, and the random number data section includes the index information.

12. The generation device according to claim 5, wherein the index information includes a number of hash areas and, for each hash area, the head address and the size.

13. The generation device according to claim 5, wherein the random number fills the free space of the firmware such that the free space is difficult to compress.

14. The generation method according to claim 6, wherein the index information includes a number of hash areas and, for each hash area, the head address and the size.

15. The non-transitory computer-readable recording medium according to claim 7, wherein the index information includes a number of hash areas and, for each hash area, the head address and the size.

* * * * *